United States Patent [19]

Van der Smissen et al.

[11] 4,277,443

[45] Jul. 7, 1981

[54] AIR PURIFYING CARTRIDGES FOR RESPIRATORS

[75] Inventors: Carl-Ernst Van der Smissen, Lübeck; Gerd Pantaleon-Stemberg, Mölln, both of Fed. Rep. of Germany

[73] Assignee: Drägerwerk Aktiengesellschaft, Fed. Rep. of Germany

[21] Appl. No.: 89,447

[22] Filed: Oct. 30, 1979

[30] Foreign Application Priority Data

Dec. 2, 1978 [DE] Fed. Rep. of Germany ....... 2852240

[51] Int. Cl.[3] .......................... A62B 7/08; F01N 3/15; B01J 8/02

[52] U.S. Cl. .................................... 422/122; 422/181; 422/206; 422/222; 422/218; 422/239; 422/188; 55/484; 55/DIG. 35; 128/202.26

[58] Field of Search ............... 422/175, 177, 211, 206, 422/188, 120, 122, 125, 180, 181, 218, 222, 228, 239; 55/387, 484, 482, DIG. 35, DIG. 33, 269, 267, 484, 498; 128/205.28, 202.26, 205.12

[56] References Cited

U.S. PATENT DOCUMENTS

| | | | |
|---|---|---|---|
| 1,501,286 | 7/1924 | Logan | 55/DIG. 33 |
| 1,843,446 | 2/1932 | Drager | 55/DIG. 33 |
| 2,174,528 | 10/1939 | Prentiss | 55/DIG. 33 |
| 2,315,525 | 4/1943 | Hulsberg | 422/188 |
| 4,193,966 | 3/1980 | Dowgul | 422/122 |

*Primary Examiner*—William F. Smith
*Assistant Examiner*—Chris Konkol
*Attorney, Agent, or Firm*—McGlew and Tuttle

[57] ABSTRACT

A cartridge for respirators for purifying expiratory air contains a chemical arranged in layers separated by partitions which are connected to a perforated central tube. The partition cooperates with a member spaced from a wall of the cartridge and a guide element disposed on the partition to provide alternate passage of the air into the layers.

13 Claims, 3 Drawing Figures

FIG. 1
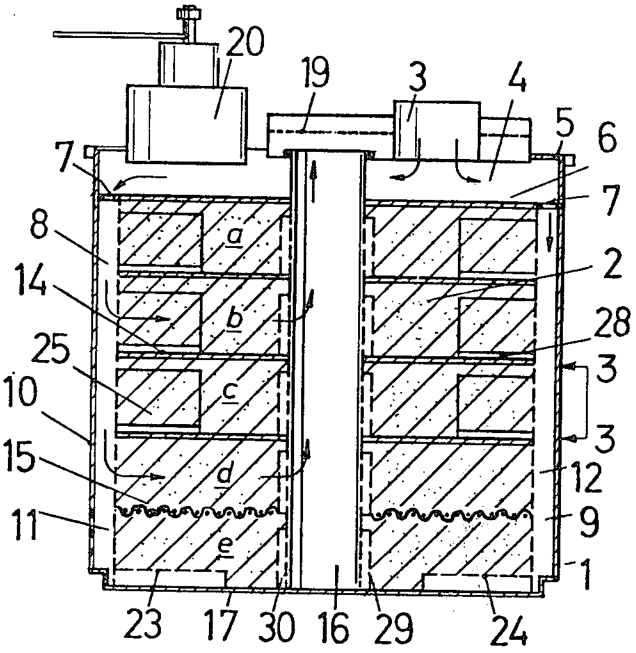
FIG. 2
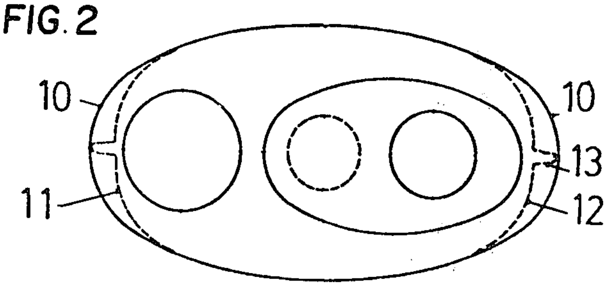
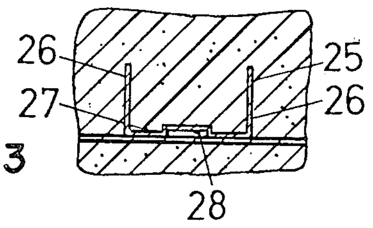
FIG. 3

AIR PURIFYING CARTRIDGES FOR RESPIRATORS

FIELD AND BACKGROUND OF THE INVENTION

The present invention relates, in general, to an air purifying cartridge for respirators of the type containing a chemical that releases oxygen under the action of carbon dioxide and moisture and, more particularly, to an air purifying apparatus for purifying expiratory air which contains a chemical, such as potassium perioxide, arranged in layers and separated by partitions within a housing.

Air purifying cartridges, in which oxygen is released from a filling material when expiratory air having a carbon dioxide portion and moisture is introduced, depend, with respect to their efficacy and durability in a warm environment, on the guidance of the expiratory air which is to be regenerated inside the air purifying cartridge as well as on the dissipation of heat, taken into the pastiness and coagulation of the filling material.

A known air purifying cartridge having a circular to oval cross-section contains potassium peroxide as the filling material in layers which are separated from each other by partitions. The supply of the respiratory air is effected through an axially arranged central tube which extends to the outside of the cartridge through a cover.

The central tube has bores distributed over the circumference between the intermediate screens through which a connection is established between the respective layers and the central tube. The expiratory air flows through the filling material within the cartridge from a space above the first layer into a space beyond the last layer. A partial current of this treated respiratory air flows through the tube bores into the central tube and combines there with the respiratory air that has entered the tube through bores communicating with the other layers and through an inlet to the central tube.

The air purifying cartridge can also be used in the opposite direction, that is, with the inflow directed through the central tube and the outflow through a connecting socket in the cover. In the first layers, a higher velocity of flow of the expiratory air having the higher carbon dioxide and moisture content, and in the following layers, a lower velocity of the expiratory air having a lower $CO_2$ and moisture content leads to an effective utilization of the filling material. The use of this cartridge is limited where a prolonged period of use is desired by the pastiness and thus coagulation of the filling material which develops after a certain period of use. The pastiness is enhanced by the higher temperature of a warm environment. The coagulation makes further use impossible due to increased flow resistance. No reasonable extension of the time of use can be achieved by increasing the amount of the filling material. Measures must be taken to eliminate the heat and to account for the pastiness.

In another air purifying cartridge in which the filling material is arranged in layers separated by partitions, the partitions are suspended as concentric cylindrical screens. These are sealed at the end faces with tight closures. The upper end face has a central opening, however, leading to the inner cylindrical screen. A space between the outer cylindrical screen and the housing wall serves as a guide for the gas. The expiratory air to be regenerated enters through the opening and passes radially through the inner cylindrical screen to the outside through the respective layers of filling material and arrives in the aforesaid space where it accumulates and it is exhausted at the bottom. After passing through a cooler suspended on the lower end face and a breathing bag, it is again fed to the user. This cartridge does not have any means to prevent coagulation of the filling material. The usage time is thus limited just as in the previously described air purifying cartridge.

SUMMARY OF THE INVENTION

The object of the invention is to provide an air purifying cartridge which contains a chemical that releases oxygen under the action of carbon dioxide and moisture, particularly potassium peroxide, whose time of use can be extended relative to the known cartridges, and which can be used in a warmer environment, e.g., underground. This problem is solved, according to the invention, by providing a plurality of layers of the chemical, each of which is separated by a partition disposed transversely with respect to the axis of a central perforated tube, basket or perforated sleeve members being disposed over the tube adjacent each layer and intermediate a portion of the tube and layer, each of the partitions being heat-conductive and including a U-shaped member, such as a copper guide element, at the end of the partition opposite the tube, and the U-shaped member including a portion spaced from said partition to form a passage therebetween.

The advantages achieved by the invention consist particularly in that it prevents, in a simple manner by eliminating the heat from the individual layers, the material from becoming pasty in the inlet range and, thus, from coagulating, over a longer period than heretofore. The sides of the copper guide elements, together with the partitions, ensure an effective elimination of the heat. Coagulation of the filling material takes place in the direction of flow of the expiratory air. With a flow of expiratory air initiated from the outside, i.e., U-shaped member side of a layer, the passage in between that member and the partition supplies a portion of the filling material which has not coagulated with expiratory air to be generated even after coagulation has started at the outside. This is possible because the aerodynamic resistance has not yet increased to a disturbing degree.

The baskets around the central tube positively prevent clogging of the holes in the central tube with a minimum of expenditure of material and energy. Coagulation takes place on the baskets and through the holes of the baskets. The filling material does not enter the central tube itself. The user is thus not injured by entrained filling material. The holes of the central tube are not clogged, so that there is no increased resistance at this point.

Accordingly, it is an object of the present invention to provide an air purifying apparatus for a respirator of the type in which a chemical filters and reacts with expiratory air including a housing having a sidewall and end walls defining a substantially enclosed chamber, a sheet member in the enclosed chamber spaced from at least a portion of the sidewall to provide an air flow passage therebetween and a central chamber centrally thereof, and the sheet member having at least one perforation extending therethrough. Air passage means, such as an inlet nozzle, extend through the housing, preferably at one of the end walls, and communicates with the passage. An air conducting tube is provided, centrally disposed in the central chamber and has a plurality of apertures extending therethrough. At least one perforated sleeve is disposed about at least a portion of the tube and overlies at least some of the tube apertures. A heat conducting plate extends between the sheet member and the tube and a layer of the chemical is disposed upon the heat conducting plate. Guide means disposed upon the plate adjacent the sheet member include a portion spaced from the plate and defining a passageway therebetween which communicates with the passage.

In a preferred embodiment of the invention, the guide means includes a member having a substantially U-shaped cross-section.

In accordance with a preferred construction of the invention, a plurality of heat conducting plates are successively arranged in the central chamber.

In accordance with a further preferred feature of the invention, each of the perforations of the perforated sleeve have an area twice as large as the area of each aperture of the tube.

A further object of the invention is to provide an air purifying apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In The Drawing:

FIG. 1 shows a longitudinal section through an air purifying cartridge;

FIG. 2 shows a top view, and

FIG. 3 shows a detail of a portion of the cartridge of FIG. 1 taken along lines 3—3.

DESCRIPTION OF THE PREFERRED EMBODIMENT

Referring to the drawing in particular, the invention embodied therein, comprises, a gas or expiratory air purifying apparatus in the form of a cartridge. In FIG. 1, an air purifying cartridge is shown, which comprises an elongated housing 1, having an elliptical cross-section closed at its opposite ends by a housing cover 5 and a bottom closure 17. Within the housing 1, axially extending sheet members or arched pieces 11, 12, which are perforated, rest upon the bottom closure and form a combination with a portion of sidewall 10 of the housing 1, a passage 8, 9 therebetween. A central tube 16 is centrally disposed in the housing and axially extends through the housing cover. The housing cover 5 has a nozzle 3 through which expiratory air can flow. Within the housing, a transversely arranged upper cover member 6 forms, in combination with the housing cover 5, an antechamber 4. A plurality of orifices fromed in the upper cover member 6 allow fluid communication between the antechamber 4 and the passages 8, 9.

In accordance with the invention, the air purifying cartridge includes, in housing 1, a filter and filling material 2, such as potassium peroxide, which releases oxygen from the passing expiratory air, under the action of carbon dioxide and moisture. The expiratory air, that is, to be regenerated, enters the housing 1 through nozzle 3 and passes into antechamber 4, formed between housing cover 5 and upper cover 6, which covers a first filling material layer a. The air is then conducted from there through orifices 7 into passages 8, 9 which are formed between wall 10 of housing 1 and members or pieces 11, 12 of perforated sheet metal. Arched pieces 11, 12 are propped by a fold 13 against wall 10. The filling material 2 is arranged between arched pieces 11, 12 and central tube 16. The material is divided by partitions 14 and a screen 15 into five layers, a to e. Central tube 16 which may be formed of a perforated sheet metal, is located by the five layers and by housing cover 5. Layers a through e therefore extend radially in respect to the axis of central tube 16 and the length of passages 8, 9.

Expiratory air from the passages 8, 9, traverses the filling material and flows radially into tube 16 which conveys the air to a breathing bag (not shown) after passing through dust filter 19. Dust filter 19 retains any chemical dust carried along from filter material 2 which could have a caustic effect in the respiratory tract of the user. Housing cover 5 may typically have, in addition, a chlorate starter 20, which works in a known manner.

Layers a, b, c and d are separated from each other by partitions 14. Partitions 14, as well as the upper cover 6 are preferably made of copper to ensure a good heat transfer. Layers d and e are separated from each other by a screen 15. In these layers, the path of the expiratory air is shortened by spacers 23, 24 which consist of perforated sheet metal. The lower aerodynamic resistance in these layers has the effect that they also take part in the reaction with a lower admission by expiratory air. Even after the filling material has started to coagulate after prolonged use, the resistance remains relatively low.

At the inlet ends on partitions 14, guide elements 25, bearing on arched pieces 11 and 12 are arranged. Guide element 25 is a U-shaped copper plate. The guide element includes sides 26 having a height of about ¾ of the height of layers a, b and c, and a depth of about ⅓ of the flow path distance between members 11, 12 and central tube 16. A center piece 27, which secures the guide element on the respective partitions 14, imparts a width of about ⅓ of the width of arched pieces 11, 12 to guide element 25. Center piece 27 forms in its center, by heightening a passageway 28, with a width of about ¼ of members or pieces 11, 12 and a clearance height of about 1/10 of the layer height. Guide elements 25 keep the aerodynamic resistances low.

Coagulation of filling material 2 by heat dissipation is delayed due to the good thermal conductivity of copper. If the resistance rises nevertheless, expiratory air is conducted through passageway 28 and thus bypasses the zone in the respective layer that has already coagulated. Coagulation starts in the direction of flow from arched pieces 11, 12.

The aerodynamic resistance is kept low, even after filling material 2 has started to become pasty and coagulates by baskets 29 of perforated sheet metal, which are pushed in each layer over central tube 16. With a distance of about 3 mm, they form antechambers 30 in front of central tube 16. The holes in basket 30 are about twice as large in area as the holes in central tube 16. The pasty filling material 2 enters antechambers 30 through the larger holes of baskets 29, without clogging the holes in central tube 16. The larger holes in basket 29 are not clogged substantially. Antechambers 30 prevent beyond that parts of filling material 2 from being carried along, which could injure the user.

While a specific embodiment of the invention has been shown and described in detail to illustrate the application of the principles of the invention, it will be understood that the invention may be embodied otherwise without departing from such principles.

What is claimed is:

1. In combination with an expiratory air purifying cartridge for respirators of the type which contains a chemical, such as potassium peroxide, for releasing oxygen under the action of carbon dioxide and moisture, the chemical being arranged in layers separated by partitions, the layers being disposed between a perforated central tube and an air duct, so that the air traverses the layers, the improvement comprising, a basket of perforated sheet metal disposed over and spaced from the central tube adjacent at least one of the layers and a U-shaped guide element disposed on one of the partitions having a center piece spaced from the partition to define a passageway therebetween in communication with the air duct.

2. The combination, according to claim 1, wherein the perforations in the basket are twice as large as the perforations in the central tube.

3. The combination, according to claim 1, wherein the distance of the basket from the central tube is about three mm.

4. The combination, according to claim 1, wherein the guide element includes leg portions having a height of about three-quarters of the height of the layer and a depth of about one-third of the distance between the duct and the tube.

5. The combination according to claim 4, wherein the center piece has a width of about one-third of the width of the layer.

6. The combination according to claim 1, wherein the passageway has a width of about one-third of the width to the layer and a clearance height of about one-tenth of the layer height.

7. The combination according to claim 1, wherein the guide element is a copper plate.

8. The combination according to claim 1, further comprising a screen disposed between at least some of the layers.

9. The combination according to claim 8, wherein a basket is disposed adjacent layers separated by said screen.

10. The combination according to claim 1, further comprising sheet metal spacers arranged under a layer of the chemical at the bottom of the cartridge.

11. An air purifying apparatus, for a respirator of the type in which a chemical filters and reacts with expiratory air, comprising, a housing having a sidewall and end walls defining a substantially enclosed chamber, a sheet member in said enclosed chamber spaced from at least a portion of said sidewall to provide an air flow passage therebetween and a central chamber, said sheet member including at least one perforation extending there through, air passage means extending through said housing and communicating with said passage, an air conducting tube centrally disposed in said central chamber having a plurality of apertures extending therethrough, a perforated sleeve disposed about at least a portion of said tube and overlying at least some of said apertures, a heat conducting plate extending between said sheet member and said tube, a layer of the chemical being disposed upon said heat conducting plate, guide means disposed upon said plate adjacent said sheet member including a portion spaced from said plate and defining a passageway therebetween, said passageway communicating with said passage, and wherein said guide means includes a member having a substantially U-shaped cross-section.

12. The apparatus, according to claim 11, wherein said heat conducting plate is copper.

13. The apparatus, according to claim 11, further comprising a plurality of said heat conducting plates successively arranged in said central chamber.

* * * * *